(12) United States Patent
Coelho et al.

(10) Patent No.: US 6,657,568 B1
(45) Date of Patent: Dec. 2, 2003

(54) DATA PACKING FOR REAL-TIME STREAMING

(75) Inventors: Joe A. Coelho, Swansea, MA (US); Michail Medvinsky, Wayland, MA (US)

(73) Assignee: FMR Corp., Boston, MA (US)

( * ) Notice: Subject to any disclaimer, the term of this patent is extended or adjusted under 35 U.S.C. 154(b) by 0 days.

(21) Appl. No.: 10/229,314

(22) Filed: Aug. 27, 2002

(51) Int. Cl.7 .................................................. H03M 7/00
(52) U.S. Cl. ............................................ 341/60; 341/50
(58) Field of Search ............................... 341/50, 60, 63, 341/65, 67; 370/351; 710/58, 60, 61; 705/20

(56) References Cited

U.S. PATENT DOCUMENTS

| | | | | |
|---|---|---|---|---|
| 4,945,533 A | * | 7/1990 | Schroeder et al. | 370/287 |
| 5,081,654 A | * | 1/1992 | Stephenson et al. | 375/368 |
| 5,615,020 A | * | 3/1997 | Keith | 382/246 |
| 6,137,803 A | * | 10/2000 | Stiegler et al. | 370/403 |

\* cited by examiner

*Primary Examiner*—Paguy Jeanpierre
(74) *Attorney, Agent, or Firm*—Fish & Richardson P.C.

(57) ABSTRACT

To generate a data packing solution, there is a data structure to define data, and an encoder to encode a first update of data and a second update of data and to prepare for transmission the second update following the first update without regard to a boundary associated with a predefined number of bits. In one embodiment, the predefined number comprises a byte. There can also be a decoder to receive the first and second updates, to determine where the first update ends and the second update begins and to decode the updates. There can also be a transmitter to stream the first and second updates. In another embodiment, the first and second updates are associated with financial market data. In another embodiment, the data structure comprises an XML file.

55 Claims, 4 Drawing Sheets

STATE MACHINE DIAGRAM FOR DECODER CALCULATIONS

DATA PACKING FOR REAL-TIME STREAMING

TECHNICAL FIELD

This description relates to data packing for real-time streaming.

BACKGROUND

Real-time streaming is used, for example, in a trading market (e.g., a stock market) to broadcast data for every action that takes place in the market (e.g., trade volume, sell price) to a variety of customers. Often the data is sent in the form of changes to existing records. The market can produce data record changes every 250 ms. Although each of these data record changes may be small, when combined with others in the rapid succession in which they are being generated, the high aggregate volume of these small changes can consume all or a large portion of a network's bandwidth. Abstract Syntax Notation One (ASN.1) is a formal language for abstractly describing messages and it includes packed encoding techniques. Publications ISO 8825-2/ITU X.691 specify the packed encoding rules for ASN.1. The encoding techniques described in the publication align with byte boundaries when encoding a record.

SUMMARY

An objective is to generate a data packing solution more efficiently than the ISO standard to minimize the bandwidth requirements for high volume data and to increase the speed of delivery of real-time data to customers. In one aspect, there is a method comprising encoding a first update of data, encoding a second update of data and preparing for transmission the second update following the first update without regard to a boundary associated with a predefined number of bits. The method can include preparing for transmission the second update following the first update without adding one or more bits to align the first update or the second update with a byte boundary. In one embodiment, the predefined number can comprise a byte. In another embodiment at least one of the first and second updates is associated with financial market data. The method can also include streaming the first and second updates. The method can further comprise preparing for a first transmission a portion of the first and second updates that align with a transmission packet and preparing for a second transmission remaining portions of the first and second updates not prepared for the first transmission. The method can also include determining a minimum number of bits to encode a length identifier and encoding a numerical portion of the first update as a length identifier followed by a value. The method can further comprise transmitting the updates.

In another aspect, there is a method comprising encoding a first update associated with a first financial record, encoding a second update associated with a second financial record, buffering for transmission the second update following the first update without regard to a byte boundary and streaming the buffered first and second updates.

In yet another aspect there is a method comprising determining a minimum number of bits needed to represent a value without regard to a boundary associated with a predefined number of bits, generating an encoded entry corresponding to the value using the determined minimum number of bits and preparing for transmission the encoded entry without aligning the encoded entry with a boundary associated with a predefined number of bits. In one embodiment, the predefined number of bits comprises a byte. The method can include storing the encoded entry in a buffer and wherein transmitting further comprises transmitting at least a portion of contents of the buffer upon occurrence of an event, the portion based at least in part on alignment with a packet size. The method can also include storing a second encoded entry directly following any portion of the contents of the buffer not transmitted. In another embodiment, the event comprises i) passage of a predetermined amount of time or ii) storage of a predetermined amount of data within the buffer. The method can further comprise defining a set of data including one or more entries, and wherein the value is associated with a first entry. In another embodiment, the set of data comprises an XML file.

In another aspect, there is a method comprising i) receiving a stream of bits comprising a first portion associated with a first update and a second portion associated with a second update, the second portion following the first portion without regard to a boundary associated with a predefined number of bits and ii) decoding the stream of bits. In one embodiment, the predefined number comprises a byte. In another embodiment, the first portion is associated with a first record and the second portion is associated with a second record. The method can include receiving a first plurality of bits from the stream of bits, advancing a state machine in response to each bit and holding a current state of the state machine at the last bit in the first plurality if the last bit is not the last bit in the first portion. The method can also include receiving a second plurality of bits and advancing the state machine from the current state in response to the second plurality of bits. The method can further comprise advancing the state machine to an initial state at the end of the first portion.

In another aspect, there is a method comprising defining a range associated with a variable type, determining a first minimum number of bits to represent a maximum bit length to represent any value within the associated range, determining a second minimum number of bits to represent a specific value associated with the variable type and encoding the specific value other than any sign using no more bits than the sum of the first minimum number of bits and the second minimum number of bits. The method can include, if the variable type is signed, encoding the specific value using no more bits than the sum of the first minimum number of bits, the second minimum number of bits and a sign bit. In one embodiment, the variable type comprises a floating-point number, and the specific value comprises an integer portion and a decimal portion. The method can include determining a third minimum number of bits to represent the maximum value of a predefined precision, determining a fourth minimum number of bits to represent the integer portion of the specific value, determining a fifth minimum number of bits to represent the decimal portion of the specific value and determining the second minimum number of bits by summing the first, third, fourth and fifth minimum numbers of bits.

In another aspect, there is a method comprising defining a character set of a maximum number of characters, determining a minimum number of bits to represent the maximum number and encoding a string using the character set, each character in the string encoded using the determined minimum number of bits to represent a value of its order in the defined character set, the last character in the string followed by the determined minimum number of bits representing a value that is outside of the defined character set.

In another aspect, there is a system comprising a data structure to define data, and an encoder to encode a first update of data and a second update of data and to prepare for transmission the second update following the first update without regard to a boundary associated with a predefined number of bits. The system can include a decoder to receive the first and second updates, to determine where the first update ends and the second update begins and to decode the updates. The decoder can further comprise a state machine to return to an initial state at the determined end of the first set. The encoder can be further configured to buffer for transmission the second update following the first update without adding bits into the first encoded update to align the first update or the second update with the byte boundary. In one embodiment, the predefined number comprises a byte. In another embodiment, the first and second updates are associated with financial market data. The system can also include a transmitter to stream the first and second updates. The transmitter can be further configured to transmit in a first transmission a portion of the buffered first and second updates that align with a transmission packet and to transmit in a second transmission the remaining first and second updates not sent in the first transmission. In another embodiment, the data structure comprises an XML file.

In another aspect, there is a system comprising a data structure to define data, and a decoder to receive a stream of bits comprising a first portion associated with a first update and a second portion associated with a second update, the second portion following the first portion without regard to a boundary associated with a predefined number of bits and to decode the stream of bits.

In another aspect, there is an article comprising a machine-readable medium that stores executable instruction signals that cause a machine to implement the above-described methods.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
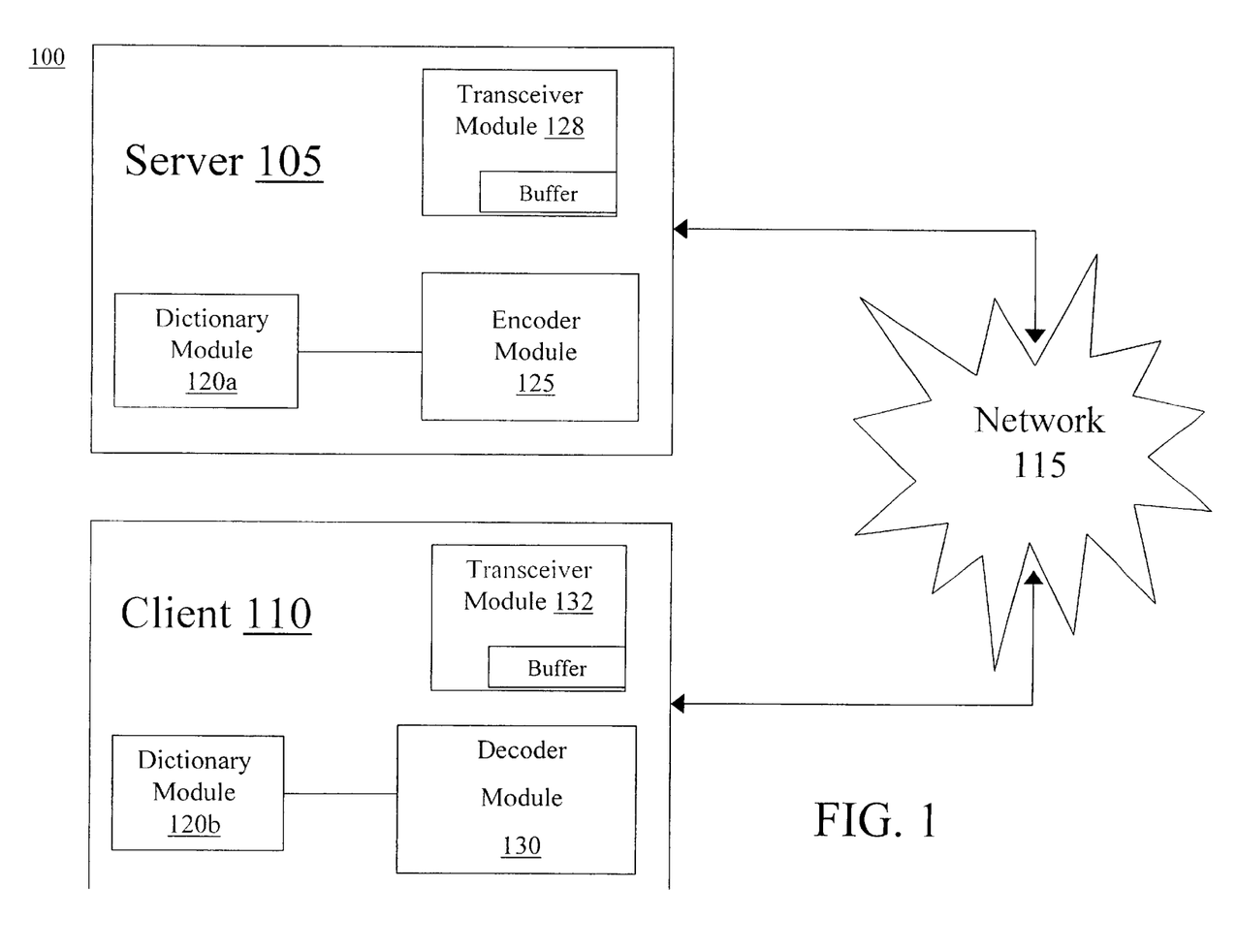
FIG. 1 is a block diagram of an illustrative embodiment of a system to encode and decode data in accordance with the invention.

In broad overview, FIG. 1 illustrates an embodiment of a system 100 to encode and transmit data. The system 100 includes a first computing system ("a server node") 105 and a second computing system ("a client node") 110, both in communication with a network 115. The server node 105 includes a dictionary module 120a, an encoder module 125 and a transceiver module 132 including a buffer to temporarily store data queued to be transmitted. The client node 110 also includes a dictionary module 120b, a decoder module 130 and a transceiver module 132 including a buffer.

The dictionary modules 120a and 120b are referred to generally as 120. The modules described here and below can be implemented, for example, as part of a software program and/or a hardware device (e.g., ASIC, FPGA, processor, memory, storage).

The server node 105 can be any computing device capable of providing the services requested by the client node 110. Particularly, this includes encoding and transmitting data to the client node 110, as described in more detail below. For clarity, FIG. 1 depicts server node 105 as a single entity. However, the server node 105 can also be for example, distributed on portions of two or more servers, and/or as part of a server farm in communication with the network 115 through, for example, a single Web server. The client node 110 can be any computing device (e.g., a personal computer, set top box, wireless mobile phone, handheld device, personal digital assistant, kiosk) used to provide user interface access to the server 105. Similar to the server node 105, the client node 110 can represent distributed processing among several client devices.

The network 115, for example, can be part of a local-area network (LAN), such as a company Intranet, a wide area network (WAN) such as the Internet or the World Wide Web or the like. The nodes 105 and 110 communicate with the network 115 using any of a variety of connections including, for example, standard telephone lines, LAN or WAN links (e.g., T1, T3, 56 kb, X.25), broadband connections (ISDN, Frame Relay, ATM), wireless connections (cellular, WLAN, WWAN, 802.11) and the like. The connections can be established using a variety of communication protocols (e.g., HTTP(S), TCP/IP, SSL, IPX, SPX, NetBIOS, Ethernet, RS232, direct asynchronous connections, VPN protocols, a proprietary protocol and the like). In one embodiment, the server 105 and the client 110 encrypt all communication when communicating with each other.

In use, the server 105 transmits updates to data records to one or more clients 110 over the network 115. The system 100 can be a pull system driven by the client 110, a push system driven by server 105 or the like. Updates include, for example, data that the server 105 has not yet transmitted to the client 110 in the first instance, data with one or more values that have changed since the server 105 previously sent corresponding data to the client 110 and the like. To transmit these updates to the client 110, the encoder 125 encodes the data. To do this, the encoder 125, using the dictionary 120, determines the minimum number of bits needed to transmit this data to the client 110. The minimum number of bits varies depending on a defined format of the value being transmitted, as described in more detail below. Using the determined minimum number of bits, the encoder 125 encodes the data and buffers the encoded data for transmission based on the occurrence of an event.

Figure 2A:
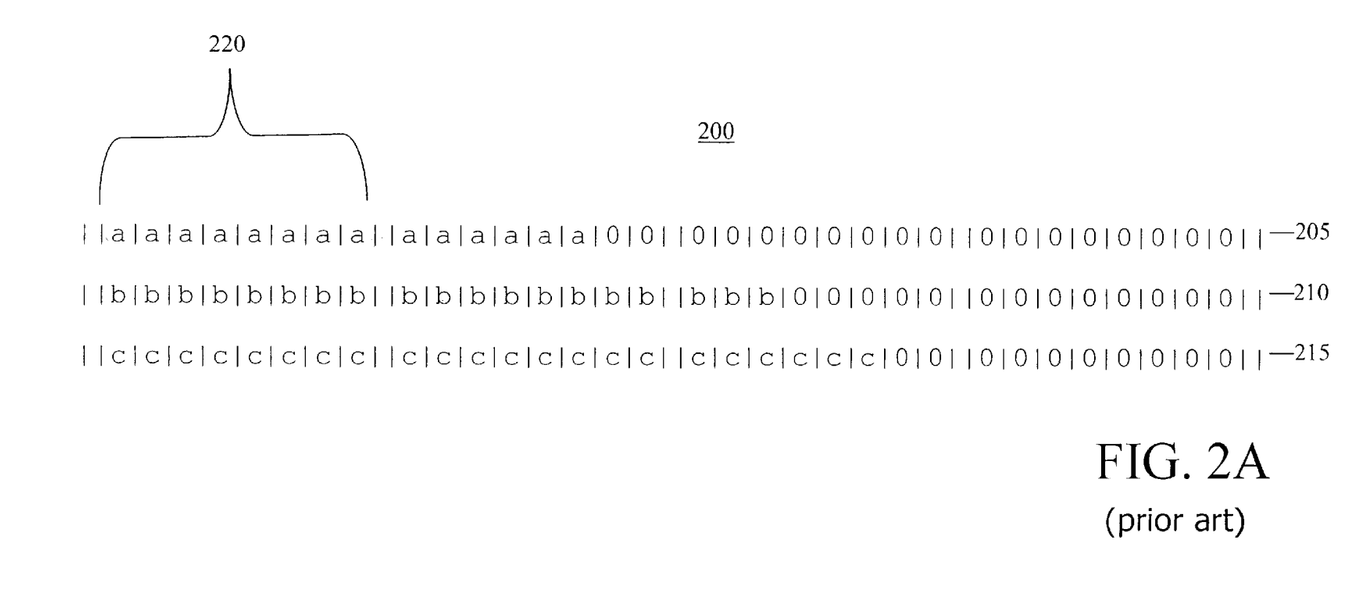
FIG. 2A is a diagram of an illustrative embodiment of a data-packing scheme known in the prior art.

FIG. 2A represents a known data-packing scheme 200. This scheme 200 illustrates a first data word 205, a second data word 210 and a third data word 215. The words 205, 210, and 215 are associated with a first record, a second record, and a third record, respectively. Each of the words comprises bytes. A byte 220 consists of eight bits. Double lines 221 indicate byte boundaries. The data words 205, 210, 215 consist of four bytes 220 each. The scheme 200 adds padding bits (e.g., bits represented by 0) to the bits representing the value of the update (e.g., bits represented by a, b, or c) to align the encoded update with a byte boundary and with a word boundary (e.g., the end of a byte or the end of the word 205, 210, 215). In other words, this system sends information only in words having a common predetermined number of bytes each of which contains a common predetermined number of bits. If the information to be sent does not require the full number of available bits, filler is inserted.

Figure 2B:
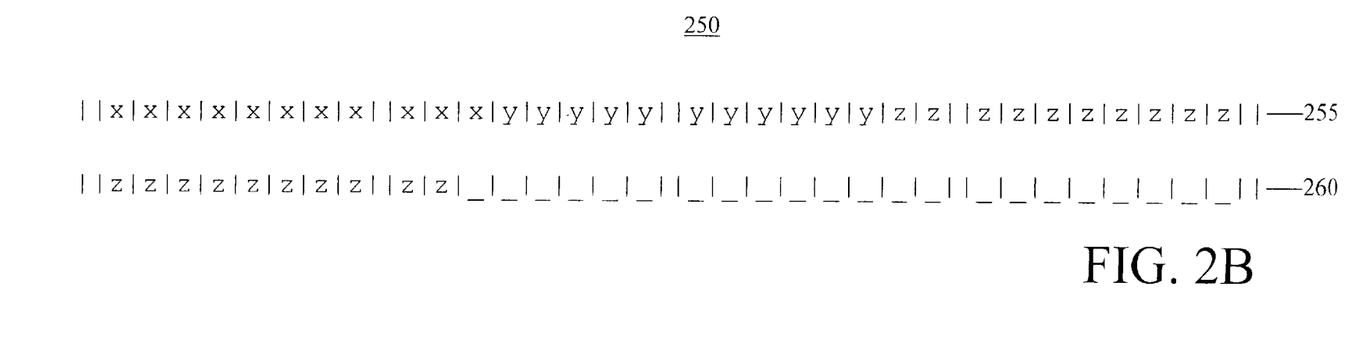
FIG. 2B is a diagram of an illustrative embodiment of a data-packing scheme in accordance with the invention.

FIG. 2B represents a data-packing scheme 250 in which, unlike the system of FIG. 2A, the words to be sent are not constrained to have a predetermined number of bytes each of a predetermined length. This scheme 250 illustrates a first data word 255 and a second data word 260. The bits representing the value of the update are indicated as x, y and z. The x bits, y bits and z bits are associated with a first record, a second record, and a third record, respectively. The scheme 250 buffers and sends the y bits immediately following the x bits, without regard to byte boundaries. The scheme 250 buffers the z bits immediately following the y bits, again without regard to byte boundaries. The remaining bits in the second word 260 remain unassigned so that if another encoded value is ready for transmission prior to the second word 260 being transmitted (e.g., before the occurrence of an event, an event being something measurable that can trigger transmission), the scheme 250 adds the bits associated with the new value directly following the z bits, even if the new value is associated with another record.

Although the data packing schemes 200 and 250 illustrate big-endian order (in which the most significant bit is on the left for each of the records), the schemes can similarly be represented in little endian order, in which the term "immediately following" refers to the little endian order of right to left. The data-packing scheme 250 is not limited to boundaries of eight bits. The eight-bit byte boundary used as the illustrated embodiment is the industry standard recognized boundary. More generally, however the scheme 250 illustrates encoding and/or buffering for transmission the second update following the first update without regard to a boundary associated with a predefined number of bits. If the industry standard recognized grouping changes that predefined number from eight bits to seven bits, nine bits or the like, the techniques described here would apply equally well.

Referring back to FIG. 1, in the illustrative embodiment, the dictionary 120a on the server 105 is the same as the dictionary module 120b on the client 110. Both the encoder 125 and the decoder 130 use the dictionary 120 to process the transmitted data. The following is an illustrative example of a dictionary definition.

```
<?xml version="1.0"?>
<sef-dictionary version="1.0">
<streaming-options pad-time="40000" pad-updates=
   "1"/>
<format-decl>
<format name="int2" impl="numeric" size="0-65565"
   signed="no"/>
<format name="int4" impl="numeric" size="0-
   10000000" signed="no"/>
<format name="subject" impl="string" charset="A-Za-
   z0-9.^\-"/>
<format name="exchange" impl="string" charset="A-
   Z"/>
<format name="uprice" impl="float" signed="no"
   integral="5000000" precision="6"/>
<format name="price" impl="float" signed="yes"
   integral="5000000" precision="6"/>
</format-decl>
<record-decl>
<record name="equity" id="1">
<field fmt="subject" name="SYMBOL"/>
<field fmt="int2" name="SYMBOLID"/>
<field fmt="uprice" name="LAST"/>
<field fmt="exchange" name="LAST_EXCHANGE"/>
<field fmt="int4" name="TRADE_SIZE"/>
<field fmt="int4" name="LAST_TIME"/>
<field fmt="uprice" name="BID"/>
<field fmt="int4" name="BID_SIZE"/>
<field fmt="int4" name="BID_TIME"/>
<field fmt="exchange" name="BID_EXCHANGE"/>
<field fmt="uprice" name="ASK"/>
<field fmt="int4" name="ASK_SIZE"/>
<field fmt="int4" name="ASK_TIME"/>
<field fmt="exchange" name="ASK_EXCHANGE"/>
<field fmt="int4" name="VOLUME"/>
<field fmt="price" name="CHANGE"/>
</record>
</record-decl>
</sef-dictionary>
```

For simplicity, the exemplary dictionary above is declared in XML 1.0 with the "XML version" tag. In this example, the system 100 uses a standard XML parser to parse this exemplary dictionary definition and produce a binary format dictionary, which is then used by the encoder 125 and decoder 130. The "sef-dictionary" tag is a top-level dictionary tag. Its attributes can include, for example, "version", which specifies a version of this dictionary. In the exemplary dictionary definition, the dictionary version is 1.0. In one embodiment, the system 100 can use the value of this tag to ensure that the dictionary 120a is identical to the dictionary 120b.

The "streaming-options" tag declares flush policies (e.g., events used to determine when to transmit data) for the streaming service. Its attributes can include, for example, "pad-time" and "pad-updates". The "pad-time" attribute defines the time period, in milliseconds, after which the encoder 125 flushes its stream. The "pad-updates" attribute defines how many updates after which the encoder 125 flushes its stream. In the exemplary dictionary definition, the "pad-time" is defined as 40000 ms. In other words, after the occurrence of 40 seconds, the encoder 125 transmits the encoded data. The "pad-update" is defined as 1. In other words, after the occurrence of 1 update, the encoder 125 transmits the encoded data.

The "format-decl" tag starts the format declaration tree. The "format" tag declares a new instance of a format implementation. Its attributes can include, for example, "name", the name of the format, and "impl", the implementation type. For example, implementation types can include "numeric", "float", "string", "enum", and "octet". The "numeric" implementation can have a "size" attribute. The "size" can define a range. The "numeric" implementation can also have a "signed" attribute indicating whether the defined format allows for a sign bit. The exemplary dictionary has two defined "numeric" type formats. The "numeric" type format named "int2" has a range from 0 to 65565. The "numeric" type format named "int4" has a range from 0 to 10,000,000. Neither format allows signed values.

The "float" implementation can have a "signed" attribute indicating whether the defined format allows for a sign bit. The "float" implementation can also have an "integral" attribute indicating the maximum integer number allowed. The "float" implementation can also have a "precision" attribute indicating the integer precision. The exemplary dictionary has two defined "float" type formats. The "float"

type format named "uprice" does not allow signed values. The "float" type format named "price" does allow signed values. Both formats have a maximum range of 5,000,000. Both formats have a "precision" of six.

The "string" implementation can have a "charset" attribute that specifies what characters are used for this format. The characters can be listed individually or defined as a range. For example, the exemplary dictionary has two defined "string" type formats. The "string" type format named "subject" is defined as the range of capital letters from A to Z, the range of small letters from a to z, the range of digits from zero to nine and three characters ">", "^", and "-". The "\" symbol precedes the "-" symbol the indicate that the "-" symbol is not being used to define a range, as in the capital letters, but is in fact a recognized character in the character set used for the "subject" "string" type format. The "string" type format named "exchange" is defined as the range of capital letters from A to Z.

The "enum" implementation can have a pipe-separated enumeration of strings (e.g., STRING|STRING|STRING| . . . ) to define the format. A string can thus be represented by an index indicating the position of the desired string within the enumeration. The "octet" implementation can have a size attribute indicating the maximum size of the binary octet. The encoder 125 can use the "octet" implementation when, for example, the encoder 125 sends graphical data.

The "record-decl" starts a record declaration tree. The "record" tab declares a record in the dictionary. A record is a structure of formatted variables presented in an ordered list. The record tab can have "name" and "ID" attributes. The "name" attribute is the name of the defined record, and the "ID" is a unique numeric ID of the defined record. The exemplary dictionary definition names the defined record "equity" and assigns one to the "ID". The name "equity" is used because the defined fields relate to an equity product traded in a financial market. In other embodiments, other record types are defined that are associated with other traded financial products, for example, options, bonds and the like.

The "field" tab describes a single field (i.e., formatted variable) in the defined record. The "field" tab can have "name" and "FMT" (i.e., format) attributes. The "name" attribute is the name of the defined field, and the "FMT" is a pointer to a format defined in the format declaration area. The exemplary dictionary defines sixteen fields in the record named "equity". The first field is named "SYMBOL" and its format is the format named "subject", which is a "string" implementation with a predefined character set as described above. The fifth field is named "TRADE_SIZE" and its format is the format named "int4", which is an unsigned "numeric" implementation with a range from 0 to 10,000,000, as described above. The sixteenth field is named "CHANGE" and its format is the format named "price", which is a signed "float" implementation with a maximum range of 5,000,000 and a "precision" of six, as described above.

For illustrative purposes, using the above exemplary dictionary definition, the server 105 receives data corresponding to the fields in the defined record "equity" as the values of those fields are updated due to trading in financial markets. For example, a first record entry is associated with the ABC Corporation. Update data associated with the ABC Corporation includes a stock "SYMBOL" of "ABCX", a "LAST" reported sell price of $36.25 per share, and the "TRADE_SIZE" of 20,000 shares. A second record entry is associated with the XYZ Corporation. Update data associated with the XYZ Corporation includes a stock "SYMBOL" of "XYZ", a "LAST" reported sell price of $52.00 per share, and a "TRADE_SIZE" of 893 shares. In these examples, the system 100 uses the "SYMBOL" field to identify a specific equity with which the changes are associated. In another embodiment, the system 100 can use the "SYMBOLID" field to identify a specific equity. To encode these updates, the encoder 125 determines the minimum amount of bits needed.

Figure 3:
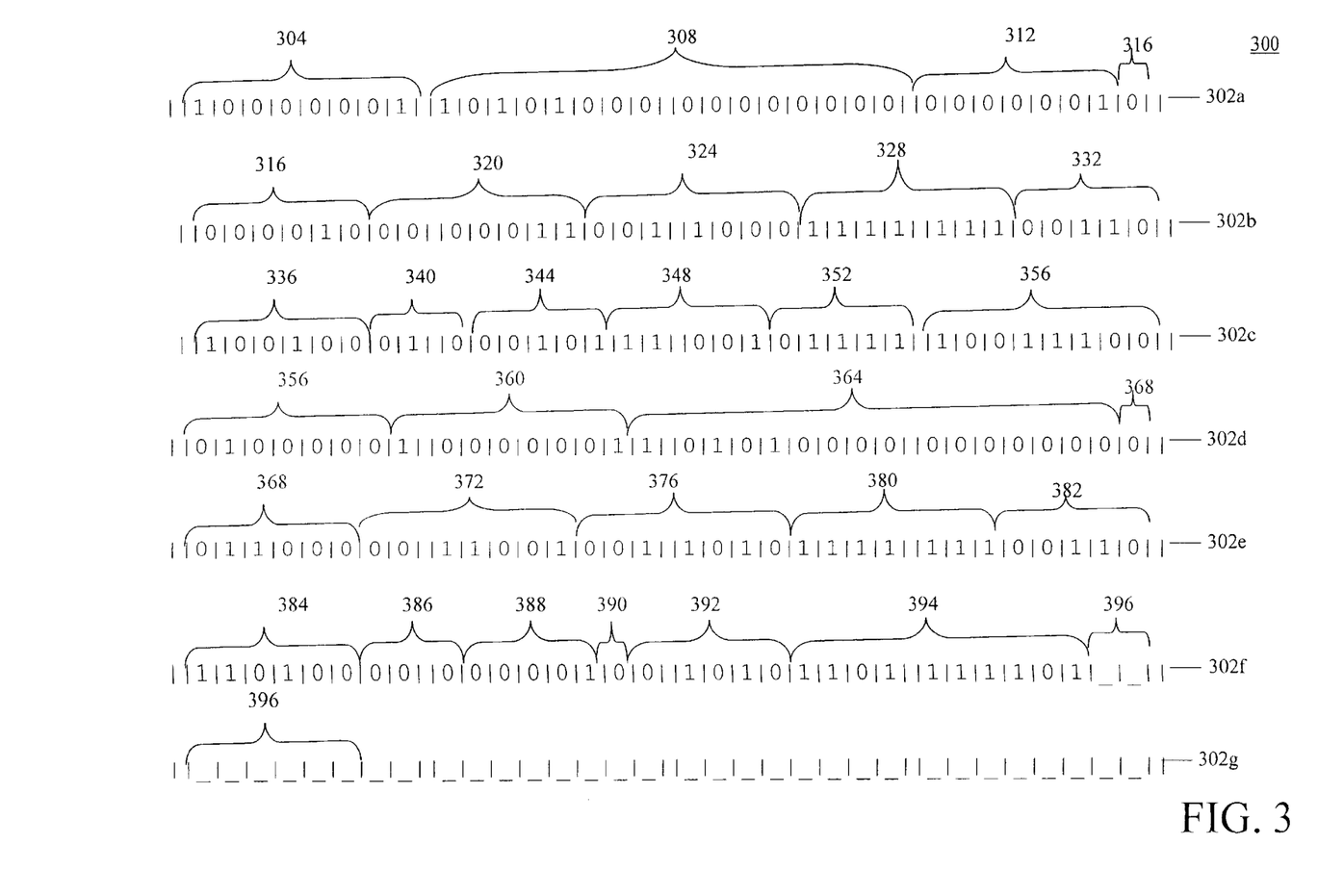
FIG. 3 is a diagram of another illustrative embodiment of a data-packing scheme in accordance with the invention.

For example, FIG. 3 illustrates an embodiment of encoded data 300 the encoder 125 generates for the above two updates associated with the ABC Corporation and the XYZ Corporation. For clarity only, each line 302a, 302b, 302c, 302d, 302e, 302f, 302g, generally 302, of the encoded data 300 includes four bytes of data. The lines 302 are arbitrarily defined and used in this embodiment only to aid in the illustration of dividing the encoded data 300 into several portions. The encoder 125 starts with the first record associated with the ABC Corporation. The encoder 125 starts the encoded update 300 by encoding a record identifier 304 representing the record type. In this example, the "equity" record has an ID of one. The binary representation of one is "1". Because the exemplary dictionary contains only one record related to equities, only one bit is needed for the record identifier. In one embodiment, however, the minimum number of bits used to identify a record is fixed and large enough to accommodate the total number of records defined in the dictionary 120 and the possibility of expansion. In the illustrated embodiment, for example, the record identifier 304 is eight bits, to accommodate a leading bit to indicate to the decoder 130 to begin decoding the record identifier 304 and seven bits to accommodate 127 possible record types.

Immediately following the record identifier 304, the encoder 125 encodes a field mask 308. The field mask 308 identifies the fields in the record type identified by the record identifier 304 that have associated changes in that particular encoded update. In one embodiment, the field mask 308 is a fixed number of bits corresponding to the number of fields in the record. For the exemplary dictionary definition, the encoder 125 uses sixteen bits because there are sixteen fields in an "equity" record. The update data associated with the ABC Corporation includes updates to the fields "SYMBOL", "LAST", and "TRADE_SIZE", which correspond to the first, third and fifth fields respectively. In the illustrated embodiment, in the field mask 308, the first, third and fifth bits are ones and the rest of the bits are zeros to indicate which fields are being updated with this encoded data 300. In the field mask 308 and all other bits in the encoded data 300, the encoder 125 can reverse the zeros and ones both in polarity and order, as long as the encoder 125 and decoder 130 are consistent. The encoder 125 can also put the bits into some other order that is arbitrary but that the decoder 130 recognizes.

Immediately following the field mask 308, the encoder 125 encodes the "SYMBOL"field update. The "SYMBOL" field is a "subject" format, which is a "string" implementation. To determine the minimum number of bits needed to encode the field, the encoder 125 determines the number of characters in the defined character set. The "charset" of the "subject" format has 26 capital letters plus 26 small letters plus 10 digits plus 3 symbols for a total of 75 characters. In this embodiment, the encoder 125 represents a character in a string by its position in the defined character set. The decimal number 75 converts to the binary representation "1001011". Because this binary representation is seven bits in length, the encoder 125 needs seven bits to represent each character. When the encoder 125 has encoded all of the characters, the encoder 125 encodes another seven bits encoding a number greater than 75, which indicates to the decoder 130 that the string is complete. The update to the "SYMBOL" field in this example is the string "ABCX". The encoder 125 encodes the first character 312 as a seven-bit long representation of one, or "0000001" in binary, because the capital A is the first character in the defined character set. The encoder 125 encodes the second character 316 as two, or "0000010" in binary, because the capital B is the second character in the defined character set. The encoder 125 encodes the third character 320 as "0000011" because the capital C is the third character in the defined character set. The encoder 125 encodes the fourth character 324 as "0011000" because the capital X is the 24$^{th}$ character in the defined character set. The encoder 125 encodes a fifth character 328 as "1111111", which is greater than 75, indicating that the string for the "SYMBOL" field is complete. The characters 312, 316, 320, 324 and 328, consisting of 35 bits, encode the complete "SYMBOL" update. Note that if eight-bit byte boundaries had been observed, the five characters would have required 40 bits.

Immediately following the fifth character 328, the encoder 125 encodes the "LAST" field update. The "LAST" field is an "uprice" format, which is an unsigned "float" implementation. To determine the minimum number of bits, the encoder 125 separates the integer and decimal portions. The value for the "LAST" field update is 36.25. To encode the integer portion "36" the encoder 125 encodes a length identifier 332 and a value 336. The length identifier 332 is the minimum number of bits to represent the length of a maximum value of the integer portion. This maximum value is defined in the format definition. For the "uprice" format, the maximum value of an integer is 5,000,000. The decimal number 5,000,000 converts to the binary representation, "10011000100101101000000", which is 23 bits. The decimal number 23 converts to the binary representation "10111". The minimum number of bits to represent the length of the maximum value of 5,000,000 is 5 bits. The length identifier 332 is fixed by the dictionary definition at 5 bits. The encoder 125 uses the length identifier 332 to indicate the length of the value 336 that immediately follows the length identifier 332. The integer portion "36" converts to the binary representation "100100", which is the value 336. The value of the length identifier 332 is six, to represent the number of bits (i.e., length) of the value 336. The decimal number six converts to "00110", which is the length identifier 332 using the five bit fixed length.

After the integer portion, the encoder 125 encodes the decimal portion "0.25". In the illustrated embodiment, the precision value 340 of the decimal portion follows the value 336. This is also a fixed amount of bits based on the maximum value for "precision" defined by the format. The "uprice" format defines the maximum precision value as six, which converts to the binary representation "110". The fixed length of the precision value 340 is three bits. The precision value 340 represents the number of places to move the decimal point to make the decimal portion an integer. For the decimal portion "0.25" the decimal point moves two places to make an integer "25". The precision value 340 for this case is two, which converts to the binary representation "010" using the three bit fixed length.

Following the precision value 340, the encoder 125 encodes the integer "25" of the decimal portion. Similar to the integer portion "36" above, to encode the integer "25" the encoder 125 encodes a length identifier 344 and a value 348. As described above, for the "uprice" format, the maximum value of an integer is 5,000,000 and so the length identifier 344 is fixed by the dictionary definition at 5 bits.

The encoder 125 uses the length identifier 344 to indicate the length of the value 348 that immediately follows the length identifier. The integer portion "25" converts to the binary representation "11001", which is the value 348. The value of the length identifier 344 is five, to represent the number of bits (i.e., length) of the value 348. The decimal number five converts to "00101", which is the length identifier 344 using the five bit fixed length.

Immediately following the value 348, the encoder 125 encodes the "TRADE_SIZE" field update. The "TRADE_SIZE" field is an "int4" format, which is an unsigned "numeric" implementation. The value for the "TRADE_SIZE" field update is 20,000. To encode the value of 20,000 the encoder 125 encodes a length identifier 352 and a value 356. As described above, the length identifier 352 is the minimum number of bits to represent the length of a maximum value. This maximum value is defined in the format definition. For the "int4" format, the maximum value of an integer is 10,000,000. The decimal number 10,000,000 converts to the binary representation "100110001001011010000000", which is 24 bits. The decimal number 24 converts to the binary representation "11000". The minimum number of bits to represent the length of the maximum value of 10,000,000 is 5 bits. The length identifier 352 is fixed by the dictionary definition at 5 bits. The encoder 125 uses the length identifier 352 to indicate the length of the value 356 that immediately follows the length identifier. The decimal number 20,000 converts to the binary representation "100111000100000", which is the value 356. The value of the length identifier 352 is fifteen, to represent the number of bits (i.e., length) of the value 356. The decimal number fifteen converts to "01111", which is the length identifier 352 using the five bit fixed length.

Immediately following the value 356, the encoder 125 encodes the second record associated with the XYZ Corporation. The encoder 125 uses a process similar to the encoding process as described above for the record associated with the ABC Corporation. The encoder 125 starts the encoded update 300 by encoding a record identifier 360. The encoder 125 positions the record identifier 360 immediately following the value 356 of the previous record update without regard to any byte boundary. In this example, the "equity" record has an ID of one. The binary representation, using the eight bit fixed length of this embodiment for the record identifier 360 is "00000001".

Immediately following the record identifier 360, the encoder 125 encodes a field mask 364. The update data associated with the XYZ Corporation includes updates to the fields "SYMBOL", "LAST", and "TRADE_SIZE", which correspond to the first, third and fifth fields respectively. In the illustrated embodiment, in the field mask 364, the first, third and fifth bits are ones and the rest of the bits are zeros to indicate which fields are being updated with this encoded data 300.

Immediately following the field mask 364, the encoder 125 encodes the "SYMBOL" field update. The "SYMBOL" field is a "subject" format, which is a "string" implementation. As described above, the encoder 125 needs seven bits to represent each character. When the encoder 125 has encoded all of the characters, the encoder 125 encodes another seven bits encoding a number greater than 75, which indicates to the decoder 130 that the string is complete. The update to the "SYMBOL" field in this example is the string "XYZ". The encoder 125 encodes the first character 368 as "0011000" because the capital X is the 24$^{th}$ character in the defined character set. The encoder 125 encodes the second character 372 as "0011001" because the capital Y is the 25$^{th}$ character in the defined character set. The encoder 125 encodes the third character 376 as "0011010" because the capital Z is the 26$^{th}$ character in the defined character set. The encoder 125 encodes a fourth character 380 as "1111111", which is greater than 75, indicating that the string for the "SYMBOL" field is complete. The characters 368, 372, 376 and 380, consisting of 28 bits, encode the complete "SYMBOL" update.

Immediately following the fourth character 380, the encoder 125 encodes the "LAST" field update. The "LAST" field is an "uprice" format, which is an unsigned "float" implementation. The value for the "LAST" field is 52.00. To encode the integer portion "52" the encoder 125 encodes a length identifier 382 and a value 384. As described above, the length identifier 384 for an "uprice" format is fixed by the dictionary definition at 5 bits. The integer portion "52" converts to the binary representation "110100", which is the value 384. The value of the length identifier 382 is six, to represent the number of bits (i.e., length) of the value 384. The decimal number six converts to "00110", which is the length identifier 382 using the five bit fixed length.

After the integer portion, the encoder 125 encodes the decimal portion "0.00". In the illustrated embodiment, the precision value 386 of the decimal portion follows the value 384. As described above, for the "uprice" format, the fixed length of the precision value 386 is three bits. The precision value 386 represents the number of places to move the decimal point to make the decimal portion an integer. For the decimal portion "0.00" the decimal point does not have to move. The precision value 386 for this case is zero, which converts to the binary representation "000" using the three bit fixed length.

In the illustrated embodiment, following the precision value 386, the encoder 125 encodes the integer "00" of the decimal portion. To encode the integer "00" the encoder 125 encodes a length identifier 388 and a value 390. As described above, for the "uprice" format, the length identifier 388 is fixed by the dictionary definition at 5 bits. The encoder 125 uses the length identifier 388 to indicate the length of the value 390 that immediately follows the length identifier 388. The integer portion "00" converts to the binary representation "0", which is the value 390. The value of the length identifier 388 is one, to represent the number of bits (i.e., length) of the value 390. The decimal number one converts to "00001", which is the length identifier 388 using the five bit fixed length. In another embodiment, the decoder 130 can be configured such that with a precision value of zero, the decoder 130 understands that the decimal portion is zero. With this configuration, the encoder 125 does not encode the length identifier 388 and the value 390.

Immediately following the value 390, the encoder 125 encodes the "TRADE_SIZE" field update. The "TRADE_SIZE" field is an "int4" format, which is an unsigned "numeric" implementation. The value for the "TRADE_SIZE" field is 893. To encode the value of 893 the encoder 125 encodes a length identifier 392 and a value 394. As described above, the length identifier 392, for the "int4" format, is fixed by the dictionary definition at 5 bits. The decimal number 893 converts to the binary representation "1101111101", which is the value 394. The value of the length identifier 392 is ten, to represent the number of bits (i.e., length) of the value 394. The decimal number ten converts to "01010", which is the length identifier using the five bit fixed length.

Immediately following the value 394, which is the end of the record associated with the XYZ Corporation, the encoder 125 encodes the value for the next record identifier 396 when the server 105 receives data for an update to another record. The "_" symbol of the record identifier 396 represents that the encoder 125 will encode a value, yet to be determined, to complete the fixed length of eight bits for the nest record identifier 396. The illustrative embodiment of the encoded data 300 includes the yet-to-be-determined record identifier 396 to emphasize that the encoder 125 locates the subsequently encoded data directly behind or after (i.e., the direction relative to direction of processing of the bit stream) the previous update to ensure a minimum amount of bits are used. The encoder 125 locates the rest of the associated subsequent record update after the next record identifier 396.

The server 105 buffers this encoded data 300 and streams the data 300 to the client 110. In a streaming environment, the server 105 transmits a continuous stream (e.g., via packets in IP) of bits to the client 110 for decoding. In one embodiment, the server transmits this data 300 at the occurrence of an event. As described above, the occurrence of an event can be that a predefined period of time elapses, a predefined amount of data is available for transmission (e.g., a predefined percentage of a buffer is full), a predefined number of updates occurs and/or the like. Although the server 105 encodes the data 300 and buffers it for transmission without regard to a boundary set by a predefined number of bits (e.g., a byte), the server 105 may have to divide the data into groups of a predetermined size based on the protocol used to transmit the data. In other words, the payload size of a packet the server 105 generates to transmit the data 300 may be limited to a predefined size. The buffering of data is a temporary storage of the encoded data until the server 105 transmits it over the network 115.

For illustrative purposes only, the server 105 generates a packet with a payload size of 16 bytes. When an event occurs, the server transmits the first four lines 302a, 302b, 302c and 302d of the data 300 for a first packet. This first packet includes all of the data for the first update associated with the ABC Corporation and a portion of the second update associated with the XYZ Corporation. The portion includes the record identifier 360, the field mask 364 and the first bit of the first character 368. The decoder 130 receives the first packet and processes the first update associated with the ABC Corporation completely. The decoder 130 processes the portion of the second update to the end of the first packet. Because the decoder 130 has not fully processed the second update, the decoder 130 remains at its current state until it receives a second packet. At an occurrence of a second event, the server 105 transmits a second packet, the payload of which starts with line 302e, since the first packet ended with line 302d. When the decoder 130 receives the second packet, the decoder 130 continues from its current state, processing the second update to its completion.

Figure 4:
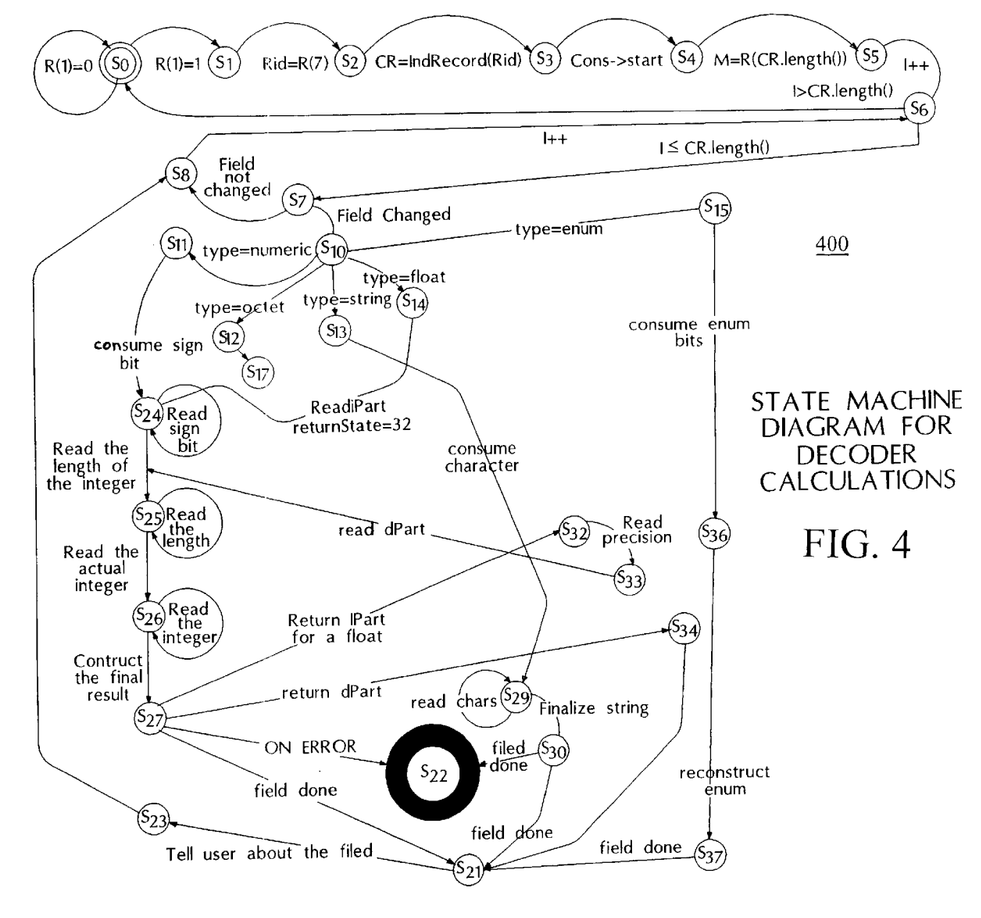
FIG. 4 is a state diagram of an illustrative embodiment of a process to decode data in accordance with the invention.

FIG. 4 illustrates an embodiment of a state diagram 400 representing a process the decoder 130 uses to decode the received data. The received data is held in a buffer and the decoder reads the buffered data bits in FIFO order. The decoder 130 starts at the initial state S0. The decoder 130 remains at state S0 until the decoder 130 reads and consumes a "1" leading bit for a record identification (e.g., 304 and 360 0f FIG. 3). Consumption of a bit is an illustrative term indicating that the bit is read and that the decoder 130 then moves to the next bit within the stream (e.g., 300) of bits that the decoder 130 receives. With detection of the "1" leading bit, the decoder 130 changes to state S1. The decoder 130 is now pointing at the second bit of the record identifier 304. At state S1, the decoder 130 reads and consumes the remaining 7 bits of the record identification (e.g., 304 and 360 of FIG. 3) and changes to state S2. Using the encoded data 300 as an example, the decoder 130 reads and consumes the eight bits "10000001" of the record identifier 304 and determines by the bit pattern that the record ID is one, corresponding to the "equity" record. With the consumption of the first eight bits, the decoder 130 is positioned to read the first bit of the field mask 308 in the received data stream 300 at a subsequent state.

At state S2, the decoder 130 finds the identified record in the dictionary 120b using the obtained record ID and changes to state S3. At S3, the decoder 130 determines from the information in the dictionary 120b the number of fields for the identified record and changes to state S4. The number of bits (e.g., length) of a field mask (e.g., 308 and 364 of FIG. 3) is equal to the number of fields. The decoder 130 reads and consumes the determined number of bits of the field mask and changes to state S5. In one embodiment, the decoder 130 checks the field mask after the decoder 130 consumes additional bits of the data stream, so the decoder 130 stores the bit pattern of the field mask after consumption for future reference. The decoder 130 initiates a counter I and changes to state S6. If the counter I is greater than the length of the field mask, indicating that the decoder 130 has decoded all of the bits of the field mask, the decoder 130 changes to the initial state S0 to wait for the next update. If the counter I is less than or equal to the length of the field mask, the decoder 130 changes to state S7.

At state S7, the decoder 130 reads the current bit of the field mask. The decoder 130 can indicate the current bit by an index value (e.g., using the counter I), a most significant bit in a shift register, and the like. Initially, the current bit is the first bit in the field mask. If the current bit indicates a field is changed (e.g., the bit is "1"), the decoder 130 changes to state S10. If the current bit indicates a field is not changed (e.g., the bit is "0"), the decoder 130 changes to state S8. At state S8, the decoder 130 advances the counter I and changes to state S6. The decoder 130 repeats this loop (i.e., states S6, S7 and S8) until the decoder 130 reads all of the field mask bits, at which point, the state S6 changes to S0, as described above. While repeating the loop, the decoder 130 advances the current bit to the next bit in the field mask at one of the states S6, S7 or S8. To advance the current bit for example, the decoder 130 can increment the index value by one, shift the shift register by one bit and the like. If the current bit implementation uses the counter I, then the decoder 130 advances the current bit when it advances the counter I.

For example, starting at the first bit of the field mask 308, the decoder 130 reads and consumes the "1". In this embodiment, the "1" represents an update to the corresponding field. The decoder 130 uses the dictionary 120b and determines that the first field is a "string" implementation and advances to state S13. After processing all of the bits associated with the update of the first field (e.g., 316, 320, 324 and 328 of FIG. 3), as described in more detail below, the decoder 130 advances to state S8. At state S8, the decoder 130 advances the counter I to two and changes to state S6. The counter I, currently equal to 2, is not greater than the length of the field mask 308 (i.e., length=16), so the decoder 130 advances the current bit to the second bit in the field mask 308, which is a "0", and changes to state S7. In this embodiment, the second bit "0" represents that there is no update to the corresponding second field, so the decoder 130 advances to state S8. The decoder 130 advances around the loop (e.g., states S8, S6 and S7), advancing the current bit of the field mask 308 and the counter I and continues this process until the decoder 130 processes all sixteen of the bits in the field mask 308.

As illustrated in FIG. 4, the decoder 130 follows different paths to process the different implementation types. At state S10, the decoder 130 uses the dictionary 120b to determine the implementation type of the changed field. Based on the implementation type, the decoder 130 changes state. For a "numeric" implementation, the decoder 130 changes from state S10 to state. S11. At state S11, the decoder 130 determines whether the defined "numeric" field corresponding to the updated field is signed or unsigned and changes to state S24. If the field is signed, the decoder 130 reads and consumes the sign bit. The decoder 130 changes to state S25.

At state S25, the decoder 130 determines, similar to the encoder 125, the length (e.g., number of bits) of the length identifier (e.g., 352 and 392 of FIG. 3). As described above, the length is fixed and based on the maximum range of the defined field. The decoder 130 reads and consumes the determined number of bits for the length identifier of the field update. The decoder 130 determines a value for the length based on the read bits and changes to state S26. At state S26, the decoder 130 reads and consumes the determined number of bits following the length identifier. The decoder 130 changes to state S27. The decoder 130 determines the value based on the read bits and changes to state S21. State S21 indicates that the update for that particular field is complete and the decoder 130 changes to state S23. At state S23, the decoder 130 communicates this determined value to the client 110, which renders the update by displaying, printing and the like. The decoder 130 changes to state S8.

Referring back to state S10, for an "octet" implementation, the decoder 130 changes from state S10 to state S12. An encoded "octet" update includes a length identifier and the octet data. An octet is eight bits of data. The defined "octet" field defines the maximum number of octets allowed in a field update. As described above, the length identifier is the minimum number of bits needed to represent the maximum number of octets. At state S12, the decoder 130 uses the data dictionary 120b to determine the minimum number of bits for the length identifier. For example, the dictionary 120 can define an "octet" field that allows a maximum of 20,000 octets. The decimal number 20,000 converts to the binary representation "100111000100000", which is fifteen bits. The length identifier for this "octet" field is fifteen bits.

The decoder 130 reads and consumes the determined minimum number of bits (e.g., 15 for the 20,000 maximum example) and then determines the length of the octet data. The decoder 130 changes to state S16. At S16, the decoder 130 reads and consumes the determined amount of octet data. The decoder 130 changes (path not shown) to stat S21. State S21 indicates that the update for that particular field is complete and the decoder 130 changes to state S23. At state S23, the decoder 130 communicates this octet data to the client 110, which process the update as necessary. The decoder 130 changes to state S8.

Referring back to state S10, for a "string" implementation, the decoder 130 changes from state S10 to state S13. At S13, the decoder 130 determines the minimum number of bits needed to represent each character in the string. The decoder 130 uses the defined character string in the dictionary 120b, similar to the encoding process described above, to determine the number of bits. The decoder 130 changes to state S29. At state S29, the decoder 130 reads and consumes the determined minimum number of bits for the first character. The decoder 130 converts the binary representation to decimal to determine the character based on its order in the defined character set, as described for the encoding process above. The decoder 130 reads and consumes the next determined minimum amount of bits and converts those bits into a character. The decoder 130 repeats this process until the conversion indicates a decimal value that is greater than the defined character set. This out-of-range value indicates that the string is complete. With this out-of-range value, the decoder 130 changes to state S30. At S30, the decoder 130 generates the string by concatenating the characters in their received order. The decoder 130 changes to state S21. State S21 indicates that the update for that particular field is complete and the decoder 130 changes to state S23. At state S23, the decoder 130 communicates this determined string to the client 110, which renders the update by displaying, printing and the like. The decoder 130 changes to state S8.

Referring back to state S10, for a "float" implementation, the decoder 130 changes from state S10 to state S14. At state S14, the decoder 130 determines whether the defined "float" field corresponding to the updated field is signed or unsigned and changes to state S24. If the field is signed, the decoder 130 reads and consumes the sign bit. The decoder 130 changes to state S25. At state S25, the decoder 130 determines, similar to the encoder 125, the length (e.g., number of bits) of the length identifier (e.g., 332 and 382 of FIG. 3) of the integer portion. As described above, the length is fixed and based on the maximum range of the defined field. The decoder 130 reads and consumes the determined number of bits for the length identifier of the integer portion of the field update. The decoder 130 determines a value for the length based on the read bits and changes to state S26. At state S26, the decoder 130 reads and consumes the determined number of bits following the length identifier. The decoder 130 changes to state S27. The decoder 130 determines the integer value based on the read bits and changes to state S32.

At state S32, the decoder 130 determines the minimum number of bits needed to represent the defined maximum "precision". The decoder 130 changes to state S33. At S33, the decoder 130 reads and consumes the determined number of bits representing the precision (e.g., 340 and 386 of FIG. 3). The decoder 130 decodes a precision value for the update using the read bits and changes to state S25.

At state S25, the decoder 130 determines, similar to the encoder 125, the length (e.g., number of bits) of the length identifier (e.g., 332 and 382 of FIG. 3) of the decimal portion. As described above, the length is fixed and based on the maximum range of the defined field. The decoder 130 reads and consumes the determined number of bits for the length identifier of the decimal portion of the field update. The decoder 130 determines a value for the length based on the read bits and changes to state S26. At state S26, the decoder 130 reads and consumes the determined number of bits following the length identifier. The decoder 130 changes to state S27. The decoder 130 determines the integer value of the decimal portion.

The decoder 130 changes to state S34. Using the determined integer value for the integer portion, the precision value and the integer value for the decimal portion, the decoder 130 determines the floating-point number for the field update. The decoder 130 changes to state S21. State S21 indicates that the update for that particular field is complete and the decoder 130 changes to state S23. At state S23, the decoder 130 communicates this determined floating point number to the client 110, which renders the field update by displaying, printing and the like. The decoder 130 changes to state S8.

Referring back to state S10, for an "enum" implementation, the decoder 130 changes from state S10 to state S15. At state S15, the decoder 130 determines the fixed amount of bits that represent the "enum" field update. In one embodiment, the value of an "enum" field is simply an index representing the position of the desired string in the enumeration. In this case the maximum value that the index can be is the maximum number strings in the enumeration. If the enumeration contains 50 strings, the maximum value is 50. The decimal number 50 converts to the binary representation "110010", so the minimum fixed amount of bits needed for this particular defined field is six bits. The decoder 130 changes to state S36 and reads and consumes the next six bits of the bit stream. The decoder 130 changes to state S37. Using the dictionary 120b, the decoder 130 determines an index value from the read bits and selects the enumerated string from the dictionary 120b corresponding the determined index value. The decoder 130 changes to the state S21. State S21 indicates that the update for that particular field is complete and the decoder 130 changes to state S23. At state S23, the decoder 130 communicates this determined string to the client 110, which renders the update by displaying, printing and the like. The decoder 130 changes to state S8.

As described above, the decoder 130 can receive data grouped according to some transmission size requirements, for example payload size of a transmission packet. When the decoder 130 consumes the last bit it has received, the decoder 130 stays at its current state until it receives a next group of data. As described above, in one exemplary embodiment, the server 105 generates a packet with a payload size of 16 bytes. When an event occurs, the server 105 transmits the first four lines 302a, 302b, 302c and 302d of the data 300 for a first packet. The decoder 130 receives the first packet and processes the first packet to the end of line 302d. This is the first bit of a character in a "string" field. The decoder 130 has advanced to state S29 when it processes that last bit. Because the decoder 130 has not fully processed the second update, the decoder 130 remains at its current state S29 until it receives a second packet. At an occurrence of a second event, the server 105 transmits a second packet, the payload of which starts with line 302e, since the first packet ended with line 302d. When the decoder 130 receives the second packet, the decoder 130 continues from its current state S29, processing the second update to its completion.

Also illustrated in the state diagram 400 is state S22. State S22 is an error state. The decoder 130 changes to this state, for example, when the decoder 130 encounters an error in its calculation.

For further illustration, the description below describes the decoding process to decode the first record associated with the ABC Corporation included in the encoded data 300 (FIG. 3). The decoding process described below uses the states illustrated in FIG. 4, to provide specific examples. Staring at state S0, the initial state, the decoder 130 reads and consumes the first bit of the record identifier 304. The first bit is a "1" so the decoder 130 advances to state S1. The decoder 130, now pointing to the second bit of 304 reads and consumes the next seven bits, which are "0000001". The decoder 130 changes to state S2. The decoder 130 determines the value of these seven bits is one. The decoder 130 uses the dictionary 120b to determine that the record ID of one corresponds to the "equity" record. At S3, the decoder 130 determines from the information in the dictionary 120b the number of fields for the "equity" record is 16 and changes to state S4. The decoder 130 reads and consumes the 16 bits of the field mask 308 and changes to state S5. The decoder 130 stores the bit pattern of the field mask 308 after consumption for future reference. The decoder 130 initiates a counter I and changes to state S6. The counter is initially one, so the decoder 130 changes to state S7.

At state S7, the decoder 130 reads the first bit of the field mask 308. The first bit of the field mask 308 is "1". In this embodiment, the "1" represents an update to the corresponding field. The decoder 130 uses the dictionary 120*b* and determines that the first field is a "SYMBOL" field, which is a "string" implementation and advances to state S13. The decoder 130 is now pointing to the first bit of the first character 312. Similar to the encoder 125, the decoder 130 determines that the number of bits for a character in a "SUBJECT" string is seven bits. The decoder 130 changes to state S29. The decoder 130 reads and consumes the next seven bits "0000001". The value of the bits is one, which corresponds to "A". This value is within the character set range of 1 to 75, so the decoder 130 remains at state S29. The decoder 130 is now pointing to the first bit of the second character 316. The decoder 130 reads and consumes the next seven bits "0000010". The value of the bits is two, which corresponds to "B". This value is within the character set range of 1 to 75, so the decoder 130 remains at state S29. The decoder 130 is now pointing to the first bit of the third character 320. The decoder 130 reads and consumes the next seven bits "0000011". The value of the bits is three, which corresponds to "C". This value is within the character set range of 1 to 75, so the decoder 130 remains at state S29. The decoder 130 is now pointing to the first bit of the fourth character 324. The decoder 130 reads and consumes the next seven bits "0011000". The value of the bits is twenty-four, which corresponds to "X". This value is within the character set range of 1 to 75, so the decoder 130 remains at state S29. The decoder 130 is now pointing to the first bit of the fifth character 328. The decoder 130 reads and consumes the next seven bits "1111111". The value of the bits is one hundred twenty seven, which is not within the character set range of 1 to 75, so the decoder 130 changes to state S30. The decoder 130 is now pointing to the first bit of the length identifier 332. At state S30, the decoder 130 concatenates the decoded characters to generate the string "ABCX". The decoder 130 changes to state S23 via state S21. At state S23, the decoder 130 communicates this determined "ABCX" string to the client 110, which renders the update to the user. The decoder 130 changes to state S8.

At state S8, the decoder 130 advances the counter I to two and changes to state S6. With I not greater than the field mask length of 16, the decoder 130 changes to state S7. The decoder 130 reads the second bit of the field mask 308, which is "0". In this embodiment, this indicates that the second field has no update data with the record update. The decoder 130 loops around states S8 and S6 back to S7. The decoder 130 reads the third bit of the field mask, which is "1". The decoder 130 uses the dictionary 120*b* and determines that the third field is a "LAST" field, which is a "float" implementation and advances to state S14. As stated above, at the completion of the string determination, the decoder 130 is pointing to the first bit of the length identifier 332.

At state S14, the decoder 130 determines the "LAST" field is an unsigned field and changes to state S25, via S24. At state S25, the decoder 130 determines, similar to the encoder 125, the length of the length identifier for the "LAST" field is five bits. The decoder 130 reads and consumes the next five bits "00110. The decoder 130 is now pointing to the first bit of the value 336. The decoder 130 determines the value of the length is six, based on the read bits, and changes to state S26. At state S26, the decoder 130 reads and consumes the next six bits "100100". The decoder 130 is now pointing to the first bit of the precision value 340. The decoder 130 changes to state S27. The decoder 130 determines that the integer value of the integer portion, based on the read bits, is 36 and changes to state S32.

At state S32, the decoder 130 determines that three bits are needed to represent the defined maximum "precision" of six for the "LAST" field. The decoder 130 changes to state S33. At S33, the decoder 130 reads and consumes the next three bits "010". The decoder 130 is now pointing to the first bit of the length identifier 344. The decoder 130 decodes a precision value of two, using the read bits, and changes to state S25.

At state S25, the decoder 130 determines, similar to the encoder 125, the length of the length identifier for the "LAST" field is five bits. The decoder 130 reads and consumes the next five bits "00101. The decoder 130 is now pointing to the first bit of the value 348. The decoder 130 determines the value of the length is five, based on the read bits, and changes to state S26. At state S26, the decoder 130 reads and consumes the next five bits "11001". The decoder 130 is now pointing to the first bit of the length identifier 352. The decoder 130 changes to state S27. The decoder 130 determines the integer value of the decimal portion, base on the read bits, is 25.

The decoder 130 changes to state S34. Using the determined integer value of 36 for the integer portion, the precision value of two and the integer value of 25 for the decimal portion, the decoder 130 determines the floating-point number is 36.25 for the "LAST" field update. The decoder 130 changes to state S21. State S21 indicates that the update for the "LAST" field update is complete and the decoder 130 changes to state S23. At state S23, the decoder 130 communicates this determined floating point number of 36.25 to the client 110, which renders the field update. The decoder 130 changes to state S8.

At state S8, the decoder 130 advances the counter I to four and changes to state S6. With I not greater than the field mask length of 16, the decoder 130 changes to state S7. The decoder 130 reads the fourth bit of the field mask 308, which is "0". The decoder 130 loops around states S8 and S6 back to S7. The decoder 130 reads the fifth bit of the field mask, which is "1". The decoder 130 uses the dictionary 120*b* and determines that the fifth field is a "TRADE_SIZE" field, which is a "NUMERIC" implementation and advances to state S11. As stated above, at the completion of the floating-point number determination, the decoder 130 is pointing to the first bit of the length identifier 352.

At state S11, the decoder 130 determines that the defined "TRADE_SIZE" field is unsigned and changes to state S25, via S24. At state S25, the decoder 130, similar to the encoder 125, determines the length of the length identifier for the "TRADE_SIZE" field is five bits. The decoder 130 reads and consumes the next five bits "01111". The decoder 130 is now pointing to the first bit of the value 356. The decoder 130 determines a value for the length is 15, based on the read bits, and changes to state S26. At state S26, the decoder 130 reads and consumes the next 15 bits "100111000100000". The decoder 130 is now pointing to the first bit of the record identifier 360. The decoder 130 changes to state S27. The decoder 130 determines the value is 20,000, based on the read bits, and changes to state S23, via S21. At state S23, the decoder 130 communicates this determined value of 20,000 to the client 110, which renders the update. The decoder 130 changes to state S8.

At state S8, the decoder 130 advances the counter I to six and changes to state S6. With I not greater than the field mask length of 16, the decoder 130 changes to state S7. The decoder 130 reads the sixth bit of the field mask 308, which is "0". The decoder 130 loops around states S8 and S6 back to S7. The decoder 130 continues looping and advancing the counter I since all the rest of the bits in the field mask 308 are "0". After looping such that I is greater than 16, the decoder 130 changes to state S0. As stated above, at the completion of the "numeric" field determination, the decoder 130 is pointing to the first bit of the record identifier 360. The decoder 130 repeats the entire process as described above for the second update included in the encoded data 300.

When determining values, the encoder 125 and decoder 130 can use some mathematical formulas. The number of bits needed to represent a value x is F(x)=ceiling (log 10(x)/log 10(2)). Using this formula, the encoder 125 and the decoder 130 can calculate the length of a length (e.g., length identifiers 332, 352 and the like) using F(F(x)). The encoder 125 and the decoder 130 can calculate the minimum number of bits for a "numeric" implementation using the equation L(x)=OPT(sign)+F(F(x))+F(x), where the OPT (sign) represents the optional sign bit. Similarly, the encoder 125 and the decoder 130 can use these formulas to calculate the minimum number of bits for a "float" implementation. The equation for a "float" implementation is U(x)=L(i)+F(p)+L(d), where i is the integer portion, p is the exponent and d is the normalized decimal portion. To decode the "float" implementation and obtain the original floating point number FN, the decoder 130 uses the following three formulas:

$$Y = \log 10(d)$$

$$DC = (d/10^Y)/(10^P)$$

$$FN = (-1)^{sign} * (i + DC)$$

A number of embodiments of the invention have been described. Nevertheless, it will be understood that various modifications may be made without departing from the spirit and scope of the invention. For example, the direction and polarity of bits illustrated can be reversed. The number of bits used as an industry standard boundary, for example, a byte, can change over time. The illustrated states of the decoding process can be combined or split into additional states based on implementation preferences. Accordingly, other embodiments are within the scope of the following claims.

What is claimed is:

1. A method comprising:
   encoding a first update of data;
   encoding a second update of data; and
   preparing for transmission the second update following the first update without regard to a boundary associated with a predefined number of bits and without adding one or more bits to align the first update or the second update with the boundary.

2. The method of claim 1 wherein the predefined number comprises a byte.

3. The method of claim 1 wherein at least one of the first and second updates is associated with financial market data.

4. The method of claim 1 further comprising streaming the first and second updates.

5. The method of claim 1 further comprising transmitting the updates.

6. A method comprising:
   encoding a first update of data;
   encoding a second update of data;
   preparing for transmission the second update following the first update without regard to a boundary associated with a predefined number of bits, including
   preparing for a first transmission a portion of the first and second updates that align with a transmission packet; and
   preparing for a second transmission remaining portions of the first and second updates not prepared for the first transmission.

7. The method of claim 6 wherein the predefined number comprises a byte.

8. The method of claim 6 wherein at least one of the first and second updates is associated with financial market data.

9. The method of claim 6 further comprising streaming the first and second updates.

10. The method of claim 6 further comprising transmitting the updates.

11. A method comprising:
    determining a minimum number of bits to encode a length identifier;
    encoding a first update of data, including encoding a numerical portion of the first update as a length identifier followed by a value;
    encoding a second update of data; and
    preparing for transmission the second update following the first update without regard to a boundary associated with a predefined number of bits.

12. The method of claim 11 wherein the predefined number comprises a byte.

13. The method of claim 11 wherein at least one of the first and second updates is associated with financial market data.

14. The method of claim 11 further comprising streaming the first and second updates.

15. The method of claim 11 further comprising transmitting the updates.

16. A method comprising:
    determining a minimum number of bits needed to represent a value without regard to a boundary associated with a predefined number of bits;
    generating an encoded entry corresponding to the value using the determined minimum number of bits; and
    preparing for transmission the encoded entry without aligning the encoded entry with a boundary associated with a predefined number of bits.

17. The method of claim 16 wherein the predefined number of bits comprises a byte.

18. The method of claim 16 further comprising storing the encoded entry in a buffer, and
    wherein transmitting further comprises transmitting at least a portion of contents of the buffer upon occurrence of an event, the portion based at least in part on alignment with a packet size.

19. The method of claim 18 further comprising storing a second encoded entry directly following any portion of the contents of the buffer not transmitted.

20. The method of claim 18 wherein the event comprises i) passage of a predetermined amount of time or ii) storage of a predetermined amount of data within the buffer.

21. The method of claim 16 further comprising defining a set of data including one or more entries, and
    wherein the value is associated with a first entry.

22. The method of claim 21 wherein the set of data comprises an XML file.

23. A method comprising:
    receiving a stream of bits comprising a first portion associated with a first update and a second portion associated with a second update, the second portion following the first portion without regard to a boundary associated with a predefined number of bits; and decoding the stream of bits including,
receiving a first plurality of bits from the stream of bits;
advancing a state machine in response to each bit; and
holding a current state of the state machine at the last bit in the first plurality if the last bit is not the last bit in the first portion.

24. The method of claim 23 wherein the predefined number comprises a byte.

25. The method of claim 23 wherein the first portion is associated with a first record and the second portion is associated with a second record.

26. The method of claim 23 wherein the decoding further comprises:
receiving a second plurality of bits; and
advancing the state machine from the current state in response to the second plurality of bits.

27. The method of claim 23 further comprising advancing the state machine to an initial state at the end of the first portion.

28. A method comprising:
defining a range associated with a variable type;
determining a first minimum number of bits to represent a maximum bit length to represent any value within the associated range;
determining a second minimum number of bits to represent a specific value associated with the variable type; and
encoding the specific value using no more bits than the sum of the first minimum number of bits and the second minimum number of bits.

29. The method of claim 28 wherein encoding further comprises, if the variable type is signed, encoding the specific value using no more bits than the sum of the first minimum number of bits, the second minimum number of bits and a sign bit.

30. The method of claim 28 wherein the variable type comprises a floating-point number, and wherein the specific value comprises an integer portion and a decimal portion.

31. The method of claim 30 wherein determining the second minimum number of bits comprises:
determining a third minimum number of bits to represent the maximum value of a predefined precision;
determining a fourth minimum number of bits to represent the integer portion of the specific value;
determining a fifth minimum number of bits to represent the decimal portion of the specific value; and
determining the second minimum number of bits by summing the first, third, fourth and fifth minimum numbers of bits.

32. A system comprising:
a data structure to define data; and
an encoder to encode a first update of data and a second update of data and to prepare for transmission the second update following the first update without regard to a boundary associated with a predefined number of bits and to buffer for transmission the second update following the first update without adding bits into the first encoded update to align the first update or the second update with the boundary.

33. The system of claim 32 further comprising a decoder to receive the first and second updates, to determine where the first update ends and the second update begins and to decode the updates.

34. The system of claim 33 wherein the decoder further comprises a state machine to return to an initial state at the determined end of the first set.

35. The system of claim 32 wherein the predefined number comprises a byte.

36. The system of claim 32 wherein the first and second updates are associated with financial market data.

37. The system of claim 32 further comprising a transmitter to stream the first and second updates.

38. The system of claim 32 wherein the data structure comprises an XML file.

39. A system comprising:
a data structure to define data;
an encoder to encode a first update of data and a second update of data and to prepare for transmission the second update following the first update without regard to a boundary associated with a predefined number of bits; and
a transmitter to stream the first and second updates and to transmit in a first transmission a portion of the first and second updates that align with a transmission packet and to transmit in a second transmission remaining portions of the first and second updates not sent in the first transmission.

40. The system of claim 39 further comprising a decoder to receive the first and second updates, to determine where the first update ends and the second update begins and to decode the updates.

41. The system of claim 40 wherein the decoder further comprises a state machine to return to an initial state at the determined end of the first set.

42. The system of claim 39 wherein the predefined number comprises a byte.

43. The system of claim 39 wherein the first and second updates are associated with financial market data.

44. The system of claim 39 further comprising a transmitter to stream the first and second updates.

45. The system of claim 39 wherein the data structure comprises an XML file.

46. An article comprising a machine-readable medium that stores executable instruction signals that cause a machine to:
encode a first update associated with a first record;
encode a second update associated with a second record; and
buffer the updates such that during transmission the second update follows the first update without regard to a boundary associated with a predefined number of bits and without adding one or more bits into the first update to align the first update or the second update with the boundary.

47. The article of claim 46 wherein the predefined number comprises a byte.

48. The article of claim 46 wherein the first and second records are associated with financial market data.

49. The article of claim 46 further comprising executable instruction signals that cause a machine to stream the buffered first and second updates.

50. An article comprising a machine-readable medium that stores executable instruction signals that cause a machine to:
encode a first update associated with a first record;
encode a second update associated with a second record;
buffer the updates such that during transmission the second update follows the first update without regard to a boundary associated with a predefined number of bits;

transmit in a first transmission a portion of the buffered first and second updates that align with a transmission packet; and transmit in a second transmission remaining portions of the buffered first and second updates not sent in the first transmission.

51. The article of claim 50 wherein the predefined number comprises a byte.

52. The article of claim 50 wherein the first and second records are associated with financial market data.

53. The article of claim 50 further comprising executable instruction signals that cause a machine to stream the buffered first and second updates.

54. A method comprising:

encoding a first update associated with a first financial record;

encoding a second update associated with a second financial record;

buffering for transmission the second update following the first update without regard to a byte boundary; and streaming the buffered first and second updates.

55. A method comprising:

defining a an ordered character set of a maximum number of characters;

determining a minimum number of bits to represent the maximum number; and encoding a string using the character set, each character in the string encoded using the determined minimum number of bits to represent a value corresponding to a position of that character in the ordered character set, the last character in the string followed by the determined minimum number of bits representing a value that is outside of the defined character set.

* * * * *